United States Patent
Kashimura (10) Patent No.: US 8,793,860 B2
(45) Date of Patent: Aug. 5, 2014

(54) METHOD FOR MOUNTING A METAL COLLAR REASONS FOR ALLOWANCE

(75) Inventor: Syuji Kashimura, Tokyo (JP)

(73) Assignee: Newfrey LLC, Newark, DE (US)

( * ) Notice: Subject to any disclaimer, the term of this patent is extended or adjusted under 35 U.S.C. 154(b) by 3 days.

(21) Appl. No.: 13/494,304

(22) Filed: Jun. 12, 2012

(65) Prior Publication Data

US 2012/0328825 A1 Dec. 27, 2012

(30) Foreign Application Priority Data

Jun. 21, 2011 (JP) ................................ 2011-136940

(51) Int. Cl.
| | | |
|---|---|---|
| B23P 21/00 | (2006.01) | |
| B23P 19/08 | (2006.01) | |
| F16B 19/10 | (2006.01) | |
| F16B 5/01 | (2006.01) | |

(52) U.S. Cl.
CPC .. *F16B 5/01* (2013.01); *F16B 19/10* (2013.01)
USPC ............................................. 29/512; 29/520

(58) Field of Classification Search
CPC .. F16L 41/082; B25B 27/0007; B23P 19/063; B23P 9/0621
USPC .......................................... 29/509, 512, 520
See application file for complete search history.

(56) References Cited

U.S. PATENT DOCUMENTS

| | | | | |
|---|---|---|---|---|
| 2,415,695 A | * | 2/1947 | Cann ............................... | 411/180 |
| 2,466,811 A | | 4/1949 | Huck | |
| 2,690,279 A | * | 9/1954 | Ward ........................ | 222/402.14 |
| 3,030,705 A | * | 4/1962 | Gill ........................... | 29/525.11 |
| 3,058,211 A | * | 10/1962 | Axtell ............................... | 29/509 |
| 3,263,466 A | * | 8/1966 | Shackelford ..................... | 72/114 |
| 3,766,631 A | * | 10/1973 | Scheitlin et al. ................ | 29/424 |
| 4,425,782 A | * | 1/1984 | Todisco ...................... | 72/370.01 |
| 4,929,001 A | * | 5/1990 | Phillips, II .................. | 285/141.1 |
| 5,074,026 A | * | 12/1991 | MacGregor ...................... | 29/523 |
| 5,213,378 A | * | 5/1993 | MacGregor ................ | 285/141.1 |
| 6,540,462 B1 | | 4/2003 | Bretschneider et al. | |
| 6,826,820 B2 | | 12/2004 | Denham et al. | |
| 6,851,167 B2 | * | 2/2005 | Harlow et al. ............. | 29/407.01 |
| 7,681,298 B2 | * | 3/2010 | Babej ........................... | 29/524.1 |
| 2006/0159545 A1 | | 7/2006 | Humpert et al. | |

FOREIGN PATENT DOCUMENTS

| | | |
|---|---|---|
| CN | 200993140 Y | 12/2007 |
| JP | 6-10930 U | 1/1994 |
| JP | 6-58217 U | 8/1994 |

(Continued)

*Primary Examiner* — David Bryant
*Assistant Examiner* — Jason L Vaughan
(74) *Attorney, Agent, or Firm* — Michael P. Leary (57) ABSTRACT

A method for assembling a metal collar to a resin component includes:
  inserting the metal collar into a mounting hole of the resin component, and setting them so that a flange of the collar abuts a jig;
  inserting a screw mandrel of a fastening tool into a through-hole in the collar, and rotating the mandrel so that the male threading of the mandrel engages the female threading of the jig;
  abutting a nosepiece of the fastening tool against the collar, and stopping the rotation of the mandrel;
  withdrawing the mandrel so that the nosepiece presses against one end of the collar with sufficient force to enlarge the outer diameter of that end of the collar to form an enlarged portion, thereby securing the resin component between the enlarged portion and the flange; and
  (e) rotating the mandrel in the reverse direction to disengage the respective threading.

8 Claims, 6 Drawing Sheets

(56) References Cited

FOREIGN PATENT DOCUMENTS

| JP | 9-166123 A | 6/1997 |
| JP | 11101218 A | 4/1999 |
| JP | 20000035023 A | 2/2000 |
| JP | 2006038201 A | 2/2006 |
| JP | 2007064412 A | 3/2007 |

* cited by examiner

METHOD FOR MOUNTING A METAL COLLAR REASONS FOR ALLOWANCE

CROSS-REFERENCE TO RELATED APPLICATIONS

This application claims priority from Japanese Patent Application No. 2011-136940 filed on Jun. 21, 2011, the disclosure of which is incorporated herein by reference.

BACKGROUND OF THE INVENTION

The present invention relates to a metal collar mounted in a resin component and to a mounting method therefor. More specifically, the present invention relates to a metal collar able to be mounted easily without using a press machine when the metal collar is mounted in a resin component to prevent deformation of and/or damage to the resin component, and to a mounting method therefor.

Often, when a resin component is fastened on a mounted member using a bolt, the fastening force of the bolt in the axial direction deforms, damages, or cracks the resin component. In order to prevent deformation of and/or damage to the resin component, a metal collar is fitted inside a through-hole used to fasten the resin component, and the resin component is fastened to the mounted member with a bolt via the metal collar. The metal collar can be mounted by integrating the metal collar when the resin component is molded, or by attaching the metal collar after the resin component has been molded. In the case of the latter, when the metal collar is attached after the resin component has been molded, the metal collar is inserted into a through-hole in the resin component to keep the metal collar from coming off the resin component. Afterwards, the metal collar is often deformed. The metal collar is sometimes deformed when the metal collar is forcibly crimped in the axial direction using a press machine.

However, when the metal collar is deformed using a press machine and the resin component is larger, the mounting operation is difficult to perform. As a result, a large press machine is required. Also, when the resin component has an intricate shape, it is difficult to mount a metal collar using a press machine. Also, the metal collar mounting operation is limited to locations where a press machine can be found.

A structure is disclosed in Japanese Published Unexamined Utility Model Application No. 6-58217U (Patent Document 1) in which a synthetic resin panel is fastened to a fixed member using a nut and bolt. In Patent Document 1, the structure has a flange abutting a surface of the synthetic resin panel on one end, and a metal sleeve passing through a bolt hole in the synthetic resin panel. A slit is provided in the leading end of the metal sleeve, and pressure is applied to the leading end to expand and buckle the leading end into a petal shape, which forms a spring washer portion. The synthetic resin panel is interposed between the spring washer portion and the flange. The spring washer portion is interposed between the synthetic resin panel and the fixed member. A bolt is passed through the metal sleeve and the bolt hole in the fixed member, and the bolt is fastened using a nut. In Patent Document 1, excessive fastening force is absorbed by the spring washer portion, and the synthetic resin panel can be fastened without damage. However, in Patent Document 1, because the leading end of the metal sleeve is pressed by a pressing tool to buckle and deform the leading end, it is difficult to use this structure in a press machine.

In Japanese Published Unexamined Patent Application No. 11-101218A (Patent Document 2), the metal collar has a cylindrical tubular portion and a flange portion at the base end. A counter bore is provided on the upper edge of the through-hole in the resin component, and a recess is provided on the lower edge of the through-hole to receive the flange portion. After the metal collar has been inserted into the through-hole, the leading end is pressed to buckle the buckled portion into a wedge shape. The resin component in which the metal collar has been fitted is fastened to a mounted member using a bolt via a washer. In Patent Document 2, the metal collar is prevented from coming out of the through-hole in the resin component, and the buckled portion of the metal collar prevents loosening of the fastened member. However, in Patent Document 2, it is difficult to press this metal collar with a press machine.

In Japanese Published Unexamined Patent Application No. 6-10930A (Patent Document 3), a large-diameter flange portion is formed at one end of a nut and a thin portion is formed at the end opposite that of the flange portion. After the nut has been fitted in an engagement hole in a resin frame, the thin portion of the nut is forcibly crimped in the counter bore portion of the resin frame, and the nut is engaged with the resin frame. Because the thin portion is easily deformed, it can be easily crimped. However, in Patent Document 3, the thin portion of the nut is forcibly crimped using a crimping tool. As in Patent Document 1 and Patent Document 2, it is difficult to press using a press machine.

Thus, a metal collar that can be quickly and easily mounted in a resin component is desired. A method for mounting a metal collar quickly and easily in a resin component without using a press machine is also desired. A method to easily mount a metal collar in a resin component having an intricate shape or large shape is also desired. A method for mounting a metal collar that is not limited to a location where a press machine can be found is also desired.

SUMMARY OF THE INVENTION

Therefore, it is an object of the present invention to provide a metal collar that can be quickly and easily mounted in a resin component. Another object of the present invention is to provide a method for mounting a metal collar quickly and easily in a resin component without using a press machine. Yet another object of the present invention is to provide a method for easily mounting a metal collar in a resin component with an intricate shape or large shape. Still another object of the present invention is to provide a method for mounting a metal collar that is not limited to a location where a press machine can be found. In order to achieve any of these objects, a first method of the present invention mounts a metal collar having a sleeve and a flange formed on one end of the sleeve in a mounting hole of a resin component using a fastening tool having a nosepiece for engaging a resin component, a screw mandrel with male threading, and a jig having female threading for engaging the male threading of the screw mandrel, including the steps of:

inserting the sleeve of the metal collar from below into the mounting hole of the resin component, and setting the metal collar so that the flange of the metal collar abuts the upper surface of the jig;

inserting the screw mandrel of the fastening tool into the through-hole of the metal collar, and rotating the screw mandrel in the forward direction so that the male threading of the screw mandrel engages the female threading of the jig;

abutting the lower surface of a nosepiece of the fastening tool against the end surface of the leading end of the metal collar on the end opposite that of the flange, and stopping the rotation of the screw mandrel;

withdrawing the screw mandrel, while the lower surface of the nosepiece is abutting the end surface of the leading end of the metal collar, with sufficient force to cause the lower surface of the nosepiece to push downward on the end surface of the leading end of the metal collar to form an enlarged portion in the leading end of the metal collar, thereby retaining the resin component between the enlarged portion of the metal collar and the flange; and rotating the screw mandrel in the reverse direction to disengage the female threading of the jig from the male threading of the screw mandrel.

The first method of the present invention can mount a metal collar quickly and easily in a resin component without using a press machine. It is also able to easily mount a metal collar in a resin component having an intricate shape or large shape. It is also able to mount a metal collar to a resin component in a location other than one in which a press machine can be found.

In the first method of the present invention, a sleeve of a metal collar is inserted into a mounting hole of a resin component from below, the flange of the metal collar is received by a jig, the end surface of the metal collar is pressed by the nosepiece of the fastening tool, and the metal collar is mounted. However, if desired, a second method of the present invention reverses the vertical orientation of the flange and end surface of the metal collar. The second method of the present invention is a method for mounting a metal collar having a sleeve and a flange formed on one end of the sleeve in a mounting hole of a resin component using a fastening tool having a nosepiece for engaging a resin component, a screw mandrel with male threading, and a jig having female threading for engaging the male threading of the screw mandrel, including the steps of:

inserting the sleeve of the metal collar from above into the mounting hole of the resin component, and setting the metal collar so that the end surface of the metal collar abuts the upper surface of the jig;

inserting the screw mandrel of the fastening tool into the through-hole of the metal collar, and rotating the screw mandrel so that the male threading of the screw mandrel engages the female threading of the jig;

abutting the lower surface of the nosepiece of the fastening tool against the flange on the end opposite that of the of the end surface of the leading end of the metal collar, and stopping the rotation of the screw mandrel;

withdrawing the screw mandrel while the upper surface of the jig is abutting the end surface of the leading end of the metal collar with sufficient force so that the upper surface of the jig pushes upward on the end surface of the leading end of the metal collar to form an enlarged portion in the leading end of the metal collar, thereby retaining the resin component between the enlarged portion and the flange; and rotating the screw mandrel in the reverse direction to disengage the female threading of the jig from the male threading of the screw mandrel.

In the step of withdrawing the screw mandrel of the first and second methods of the present invention, the portion of the metal collar adjacent to the end surface of the leading end of the metal collar can be buckled to form an enlarged portion. If desired, however, in the step of withdrawing the screw mandrel of the first and second methods of the present invention, the diameter of the portion of the metal collar adjacent to the end surface of the leading end of the metal collar can also be flared out to form an enlarged-diameter portion. The collar mounted using the first and second methods of the present invention as described above is a first embodiment of the metal collar of the present invention.

In a second embodiment of the metal collar of the present invention, a tiered portion can be formed in the through-hole of the metal collar, the side of the tiered portion opposite that of the flange can be a thin portion, and the thin portion can be enlarged to form the enlarged portion in the step of withdrawing the screw mandrel of the first and second methods of the present invention. The thin portion can be deformed using very little pressing force, which minimizes the impact upon the resin component.

If desired, the resin component may have a recess for accommodating the flange of the metal collar, and a counter bore for accommodating the buckled portion or enlarged portion of the metal collar. This minimizes any bulge in the resin component which may be created during mounting the collar, and does not interfere with other components.

If desired, the cross-sections of the outer surface of the sleeve and the inner surface of the through-hole in the metal collar may be circular, and the cross-section of the inner surface of the mounting hole in the resin component is circular. Alternatively, the cross-sections of the outer surface of the sleeve and the inner surface of the through-hole in the metal collar may be oval-shaped, and the cross-section of the inner surface of the mounting hole in the resin component is oval-shaped.

The second embodiment of the metal collar of the present invention includes a metal collar mounted in a mounting hole of a resin component, wherein the metal collar includes a sleeve and a flange formed on one end of the sleeve having a diameter greater than the sleeve, wherein a through-hole is formed to pass through the sleeve and the flange, wherein a tiered portion is formed on the inner surface of the through-hole in the sleeve, wherein the thickness of the sleeve from the tiered portion to the leading end opposite that of the flange is thinner than the thickness of the sleeve from the flange to the tiered portion, and wherein the axial length of the sleeve from the surface of the flange to the tiered portion is substantially equal to the thickness of the resin component.

Because there is a tiered portion in the through-hole of the metal collar, the thin portion of the metal collar from the tiered portion to the leading end can be easily deformed using very little pressing force, and the metal collar can be mounted in the resin component without adversely affecting the resin component.

If desired, the cross-sections of the outer surface of the sleeve and the inner surface of the through-hole in the metal collar may be circular. Alternatively, the cross-sections of the outer surface of the sleeve and the inner surface of the through-hole in the metal collar may be oval-shaped.

A third method of the present invention is a method for pushing a metal collar of a third embodiment of the present invention into a mounting hole in a resin component without deforming the metal collar. Accordingly, the third method is a method for mounting a metal collar having a sleeve in a mounting hole of a resin component using a fastening tool having a nosepiece for engaging a resin component, a screw mandrel with male threading, and a jig having female threading for engaging the male threading of the screw mandrel, including the steps of:

setting the metal collar so the end surface of the metal collar abuts the upper surface of the jig, and arranging the resin component on top of the metal collar so that the positions of the sleeve in the metal collar and the mounting hole in the resin component are aligned;

inserting the screw mandrel of the fastening tool into the through-hole of the metal collar, and rotating the screw mandrel in the forward direction so that the male threading of the screw mandrel engages the female threading of the jig;

abutting the lower surface of the nosepiece against the upper surface of the resin component, and stopping the rotation of the nosepiece;

withdrawing the screw mandrel, while the lower surface of the nosepiece of the fastening tool is abutting the upper surface of the resin component, with sufficient force so that the upper surface of the jig pushes upward on the end surface of the leading end of the metal collar to insert the metal collar into the mounting hole in the resin component; and rotating the screw mandrel in the reverse direction to disengage the female threading of the jig from the male threading of the screw mandrel.

The third method of the present invention can be used to mount a third embodiment of the metal collar of the present invention, in which the metal collar does not have a flange, in a resin component. Even though the outer diameter of the metal collar is greater than the inner diameter of the mounting hole in the resin component, and a large pushing force is required to push in the metal collar, the third method of the present invention causes the metal collar to be easily pushed in. However, it does not easily come out.

Accordingly, the present invention is able to provide a metal collar that can be quickly and easily mounted in a resin component. It is also able to mount a metal collar quickly and easily in a resin component without using a press machine. It further easily mounts a metal collar in a resin component having an intricate shape or large shape. It is yet further able to mount a metal collar in a resin component at a location not limited to one at which a press machine can be found.

DETAILED DESCRIPTION OF EXEMPLARY EMBODIMENTS OF THE INVENTION

Figure 1:
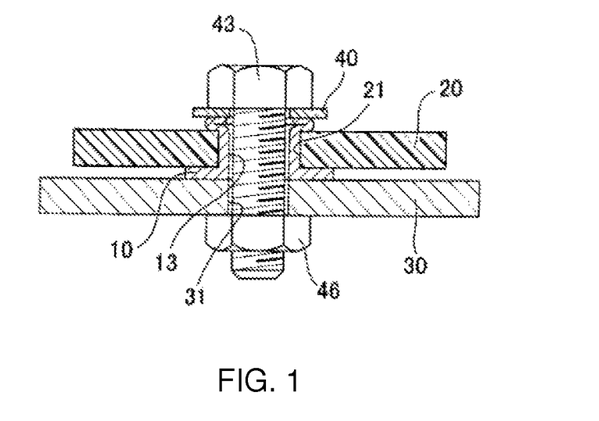
FIG. 1 is a partial cross-sectional view showing a metal collar of a first embodiment of the present invention mounted in a resin component, and the resin component fastened to a mounted member using a bolt and nut.

With reference to the Drawings, the following is a description of a metal collar 10 of a first embodiment of the present invention. It should be noted that, although the collar 10 is referred to as "metal", collar 10 made be made of materials other than metal, as long as the material can be plastically deformed to achieve the objects of the present invention, as can be appreciated by one of ordinary skill in the art. FIG. 1 shows a completed assembly of a resin component 20 (mounted component) fastened to a mounted member 30 using the metal collar 10 of the first embodiment of the present invention, in which the mounted component may be fastened to the mounted member by a bolt 43 and nut 46 via a washer 40. Because the metal collar 10 is mounted in the mounting hole 21 of the resin component 20 so that it does not come out, it can be mounted stably to the resin component 20 despite strong fastening forces, even when fastened using a bolt 43 and a nut 46. The metal collar 10 of the first embodiment may be used in the first and second methods of the present invention.

Figure 2:
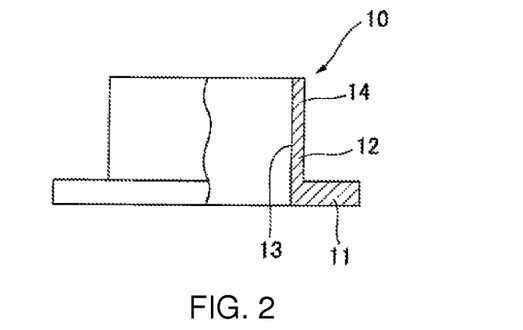
FIG. 2 is a cross-sectional front view of a portion of the metal collar of the first embodiment of the present invention.
Figure 3:
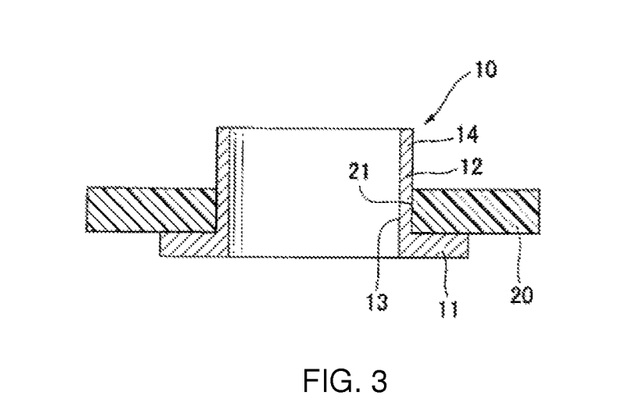
FIG. 3 is a cross-sectional view showing the metal collar of FIG. 2 set in the resin component.
Figure 4:
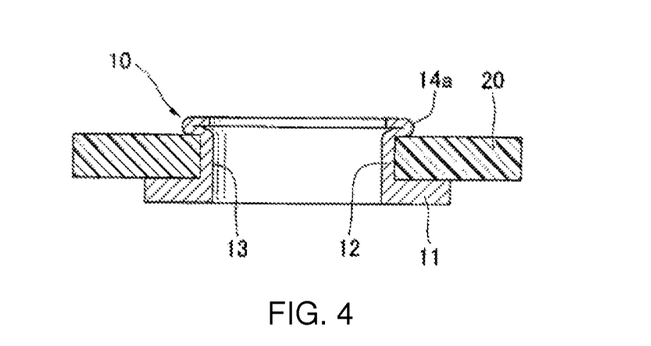
FIG. 4 is a cross-sectional view showing the leading end of the metal collar in FIG. 2 buckled and mounted in the resin component.

The following is a description with reference to FIG. 2 through FIG. 4 of the metal collar 10 in the first embodiment of the present invention and the mounting of the metal collar 10 to the resin component 20. FIG. 2 is a partially cut away front view of the metal collar 10 in the first embodiment of the present invention. The metal collar 10 includes a cylindrical sleeve 12 and a flange 11 formed on one end of the sleeve 12 having a diameter greater than that of the sleeve 12. A through-hole 13 is formed inside the flange 11 and the sleeve 12 so as to pass through the metal collar 10 in the axial direction. The end of the sleeve 12 opposite that of the flange 11 is a leading end 14 which is enlarged and crimped to the resin component 20. In the first embodiment, the thickness of the sleeve 12 is equal to the thickness of the leading end 14. In this specification, the leading end 14 is the portion near the tip which is deformed during crimping, and the leading edge is the end surface. In the first embodiment of the metal collar of the present invention, the outer surface of the sleeve 12 of the metal collar 10, and the inner surface of the through-hole 13, have round cross-sections. However, if desired, the outer surface of the sleeve 12 and the inner surface of the through-hole 13 can have oval-shaped cross-sections.

Any material can be used in the metal collar 10 as long as it can be plastically deformed. Examples include iron and aluminum. The metal collar 10 can be surface-treated as long as it can withstand deformation during crimping, such as for example, by plating to prevent rust.

FIG. 3 is a cross-sectional view showing the metal collar 10 of the first embodiment of the present invention set in the resin component 20. A mounting hole 21 is formed in the resin component 20 for insertion of the metal collar 10. The inner diameter of the mounting hole 21 is substantially the same as the outer diameter of the sleeve 12 of the metal collar 10, and the sleeve 12 of the metal collar 10 can be inserted. The inner diameter of the mounting hole 21 is smaller than the outer diameter of the flange 11. A leading end 14 of metal collar 10 is inserted into the mounting hole 21 from below, as shown in FIG. 3, and the upper surface of the flange 11 abuts the resin component 20 surrounding the mounting hole 21, and stops. Although the figures depict circular cross-sections of the of the outer surface of sleeve 12, inner surface through-hole 13, and inner surface of mounting hole 21, if it is desired to make the cross-sections of the outer surface of the sleeve 12 of the metal collar 10 and the inner surface of the through-hole 13 oval shaped, the inner surface of the mounting hole 21 in the resin component 20 should be oval shaped as well.

FIG. 4 is a cross-sectional view showing the metal collar 10 mounted in the resin component 20. As the flange 11 of the metal collar 10 provides support from below, pressure is applied to the leading end 14 from above in the long axis direction. The end surface of the leading end 14 of the metal collar 10 buckles outward slightly, and is widened to have an outer diameter greater than the inner diameter of the mounting hole 21 in the resin component 20 to form an enlarged portion 14a. The resin component 20 is thus secured between the enlarged portion 14a and the flange 11, and the metal collar 10 cannot come out of the resin component 20.

Returning to FIG. 1, the through-hole 13 in the metal collar 10 mounted in the resin component 20 is aligned with the through-hole 31 in the mounted member 30, a bolt 43 is inserted from the resin component 20 side via a washer 40 until the leading end of the bolt 43 protrudes from the mounting hole 31 in the mounted member 30, and the threading on the leading end of the bolt 43 is engaged by a nut 46, thereby fastening the resin component 20 to the mounted member 30.

Figure 5:
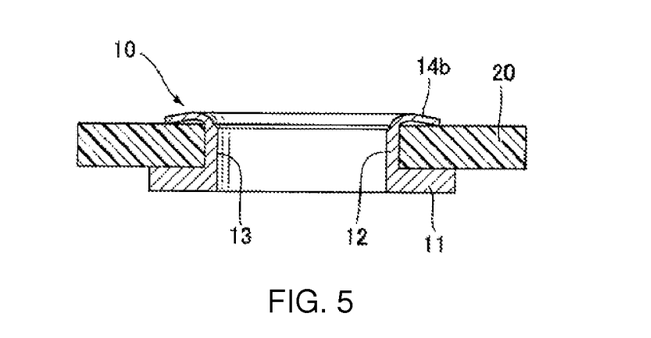
FIG. 5 is a cross-sectional view showing the diameter of the leading end of the metal collar in FIG. 2 flared out and enlarged, and the metal collar mounted in the resin component.

FIG. 5 is a cross-sectional view showing the metal collar 10 mounted in the resin component 20. The shape of the leading end 14 of the metal collar 10 is different from the shape in FIG. 4 after it has been mounted in the resin component 20. While the flange 11 of the metal collar 10 provides support from below, pressure is applied to the leading end 14 from above in the long axis direction, the diameter of end surface of the leading end 14 of the metal collar 10 is enlarged, and, rather than being buckled, is widened or flared out to form an enlarged portion 14b. The resin component 20 is thus retained between the enlarged portion 14b and the flange 11, and the metal collar 10 cannot come out of the resin component 20. When an enlarged portion 14b is formed in which the end surface has been enlarged as shown in FIG. 5, a cone shape is formed in which the outer diameter becomes larger by engagement with the lower surface of the nosepiece 52 in the fastening tool 50 described below where it abuts the leading end 14 of the metal collar 10. In this way, the diameter of the leading end 14 of the metal collar 10 is flared out and enlarged by the lower surface of the nosepiece 52 to its maximum diameter, and an enlarged portion 14b is formed.

Figure 6:
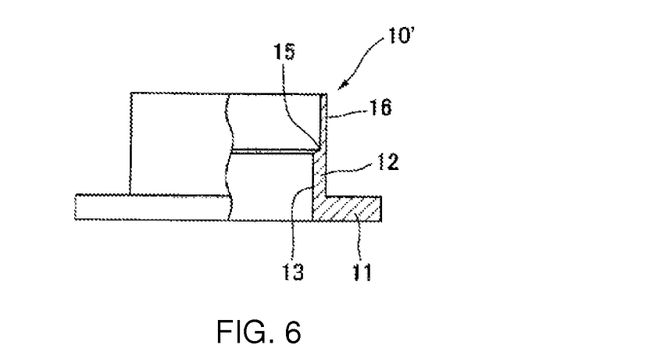
FIG. 6 is a partially cutaway cross-sectional view of a metal collar of a second embodiment of the present invention.
Figure 7:
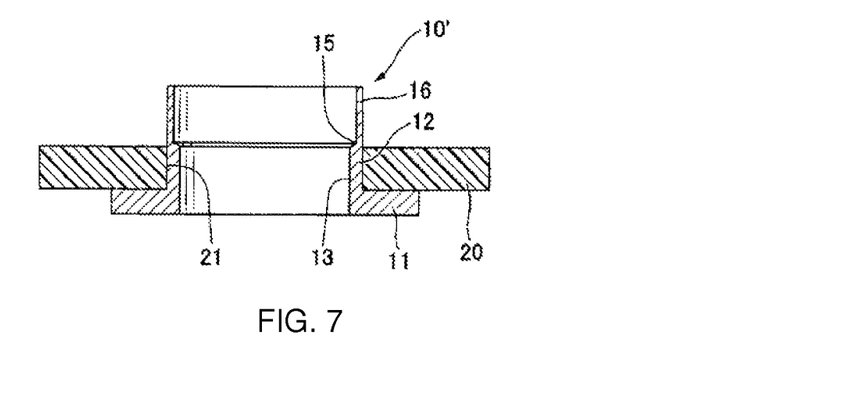
FIG. 7 is a cross-sectional view showing the metal collar of FIG. 6 set in the resin component.
Figure 8:
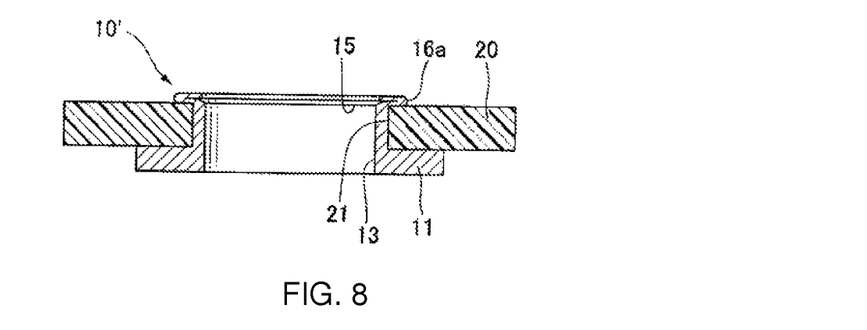
FIG. 8 is a cross-sectional view showing the thin portion of the metal collar of FIG. 6 buckled and mounted in the resin component.

FIGS. 6 through 8 show a second embodiment of the metal collar 10' of the present invention, and of the metal collar 10' mounted in the resin component 20. FIG. 6 is a partially cut-away front view of the metal collar 10' of the second embodiment of the present invention. In the metal collar 10' of the second embodiment of the present invention, a tiered portion 15 is formed on the inner surface of the through-hole 13 in the sleeve 12, and a thin portion 16 is formed from the tiered portion 15 to the leading end 14. The outer diameter of the thin portion 16 is the same as that of the sleeve 12, and the inner diameter of the thin portion 16 is greater than that of the sleeve 12. Because portion 16 is relatively thin, it is readily deformed when pressure is applied to the metal collar 10'.

FIG. 7 is a cross-sectional view showing the metal collar 10' set in the resin component 20. The thin portion 16 and the sleeve 12 of the metal collar 10' are inserted into the resin component 20 from below, and the upper surface of the flange 11 abuts the lower surface of the resin component 20. In this assembled state, the axial height of the tiered portion 15 is substantially equal to that of the upper surface of the resin component 20. Thus, only the thin portion 16 in front of the tiered portion 15 is deformed. As a result of this design of the metal collar 10' of the second embodiment of the present invention, the pressing force used to deform the portion can be very small, and hardly affects the resin component 20. If desired, as set forth above with respect to of the metal collar 10 of the first embodiment of the present invention, the outer surface of the sleeve 12 of the metal collar 10' of the second embodiment of the present invention, and the inner surface of the through-hole 13 and the thin portion 16, may have oval-shaped cross-sections, whereby the inner diameter of the mounting hole 21 in the resin component 20 should also have an oval-shaped cross-section.

FIG. 8 is a cross-sectional view showing the metal collar 10' mounted in the resin component 20. The thin portion 16 of the metal collar 10' is buckled, such that it becomes larger than the inner diameter of the mounting hole 21 in the resin component 20. The resin component 20 is thereby retained between the enlarged portion 16a and the flange 11, so that the metal collar 10' does not come out of the resin component 20. In FIG. 8, the thin portion 16 is shown as buckled, but if desired, the end surface of the thin portion 16 can instead be flared out into an enlarged diameter as shown in FIG. 5, rather than being buckled.

Figure 9:
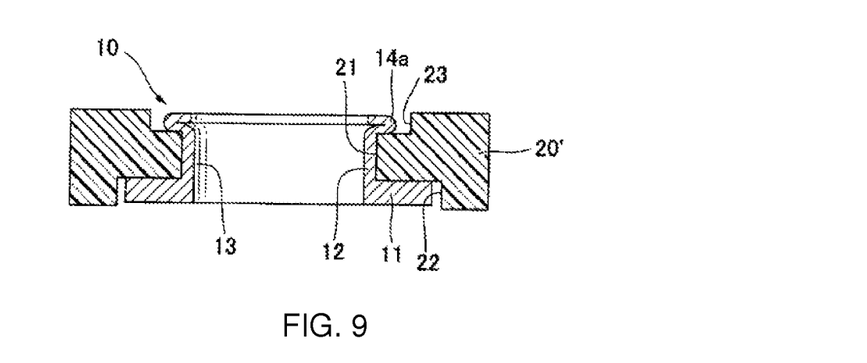
FIG. 9 is a cross-sectional view showing the metal collar of the first embodiment of the present invention mounted in a resin component in which a recess and a counter bore have been formed.

In FIG. 9, the metal collar 10 of the first embodiment is mounted in an alternate design of a resin component 20', having portions for accommodating the flange 11 and enlarged portion 14a of the metal collar 10. A mounting hole 21 is provided in the resin component 20'. A recess 22 large enough to receive the flange 11 of the metal collar 10 is provided in the lower portion of the mounting hole 21. The inner diameter of the recess 22 is larger than the outer diameter of the flange 11, and the height of the recess 22 is equal to or greater than the thickness of the flange 11 so that the flange 11 can be accommodated inside the recess 22. A counter bore 23 is provided in the upper portion of the mounting hole 21 to accommodate the enlarged portion 14a deformed by the leading end of the metal collar 10. The inner diameter of the counter bore 23 is larger than the outer diameter of the enlarged portion 14a, and the height of the counter bore 23 is equal to or greater than the thickness of the enlarged portion 14a. The length of the sleeve 12 of the metal collar 10 is determined so that the leading end 14 can form the enlarged portion 14a and enter the counter bore 23. When the recess 22 and the counter bore 23 are formed in the resin component 20', the portion of the resin component 20' in which the metal collar 10 is mounted does not bulge significantly relative to the portion of the resin component 20' in which the metal collar 10 is not mounted. Therefore this portion in which the metal collar 10 is mounted does not interfere with other components. Again, as noted above, if it is desired to form the sleeve 12 of the metal collar 10 and the through-hole 13 with oval-shaped cross-sections, and the inner diameter of the mounting hole 21 in the resin component 20' with an oval-shaped cross-section, the recess 22 and the counter bore 23 should also have oval-shaped cross-sections.

Figure 10:
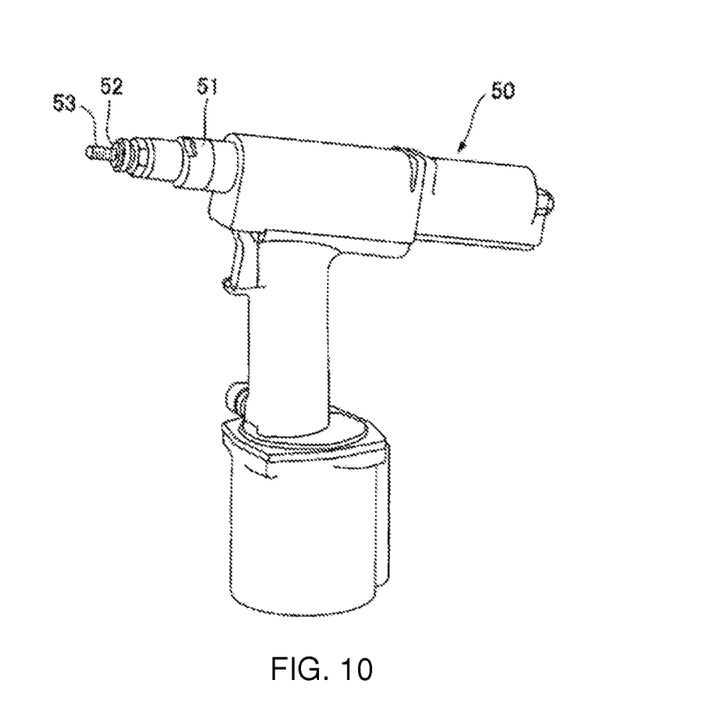
FIG. 10 is a perspective view of a fastening tool used in the present invention.
Figure 11:
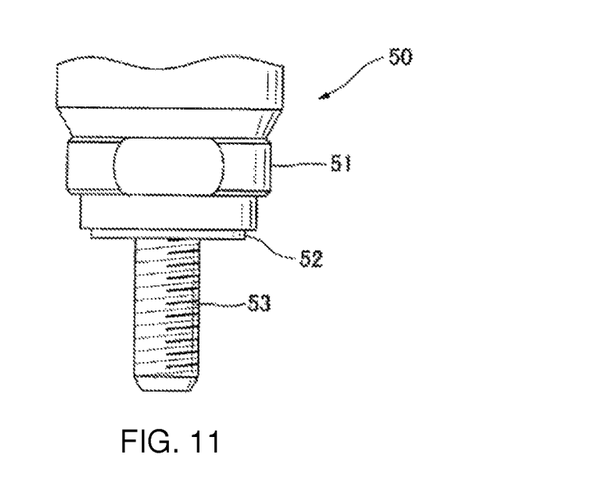
FIG. 11 is a front view showing the leading end of the fastening tool of FIG. 10.

FIGS. 10 and 11 show a fastening tool used in the methods of the present invention. FIG. 10 is a perspective view showing an entire fastening tool 50 that can be used in the present invention. This fastening tool 50 may use compressed air as the power supply. Alternatively, it can be electrically-driven. Adjacent to the main unit 51 is a nosepiece 52 for engaging the component to be fastened, and a screw mandrel 53 with male threading in the leading end. A rotating unit (not shown) is rotated, the screw mandrel 53 at the leading end is rotated in the forward or reverse direction, and the female threading in the jig is engaged or disengaged. Also, fastening tool 50 used in the present invention is constructed in such a way that screw mandrel 53 can be forcefully withdrawn rearwardly without being rotated.

FIG. 11 is a front view showing the leading end of the fastening tool 50. The main unit 51 of the fastening tool 50 is equipped with a nosepiece 52 for applying pressure to the metal collar 10. The lower surface of the nosepiece 52 is flat. A screw mandrel 53 in which male threading has been formed around a column extends downwardly in the central portion of the nosepiece 52. While the leading end 14 of the metal collar 10 is being buckled to form the enlarged portion 14a as shown in FIG. 4, the leading end 14 of the metal collar 10 has the screw mandrel 53 inside. Therefore, the leading end 14 is expanded outward slightly from the end surface and buckled without bending towards the inside. On the other hand, when it is desired to form an enlarged portion 14b at the end surface of the leading end 14 of the metal collar 10 as shown in FIG. 5, the spot where the lower surface of the nosepiece 52 in the fastening tool 50 abuts the leading end 14 of the metal collar 10 has an inclined surface in which the outer diameter grows larger moving upward. In this way, the leading end 14 of the metal collar 10 is enlarged and flared outwardly so that the end surface has a maximum diameter relative to the lower surface of the nosepiece 52, and becomes the enlarged portion 14b.

The outer diameter of the screw mandrel 53 is smaller than the inner diameter of the through-hole 13 in the metal collar 10, and can be inserted into the through-hole 13. The male threading in the screw mandrel 53 engages the female threading in a jig 60, as described below. The fastening tool 50 rotates the screw mandrel 53 in the forward direction or the reverse direction to engage or disengage, respectively, the female threading in the jig 60. Also, as set forth above, the screw mandrel 53 can be forcefully withdrawn without rotating the screw mandrel 53.

Figure 12:
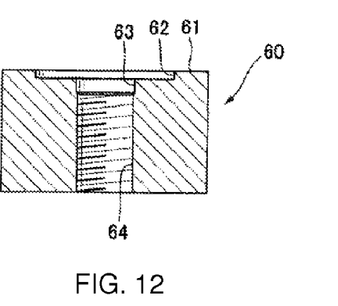
FIG. 12 is a cross-sectional view of a jig used in the present invention.

FIG. 12 is a cross-sectional view of the jig 60 used in the methods of the present invention. A tray portion 62 is formed in an upper surface 61 of the jig 60 to accommodate the flange 11 of the metal collar 10. The outer diameter of the tray portion 62 is somewhat larger than the outer diameter of the flange 11 of the metal collar 10, and can accommodate the lower portion of the flange 11. A cylindrical hole 63 concentric with the tray portion 62 and having an inner diameter smaller than that of the tray portion 62 is provided in the bottom of the tray portion 62. A female threaded hole 64 is formed in the jig 60 and opens into the bottom end of cylindrical hole 63. The female threaded hole 64 is shaped so that it can engage the male threading in the screw mandrel 53 of the fastening tool 50.

FIGS. 13(a) through 13(f) illustrate a first method of the present invention to mount the metal collar 10' of the second embodiment of the present invention to a resin component 20 using the fastening tool 50 shown in FIGS. 10 and 11, and the jig 60 shown in FIG. 12. The fastening tool 50 and the jig 60 used in the methods of the present invention are not limited to those illustrated here. Any fastening tool or jig able to perform the fastening methods described below can be used.

Figure 13:
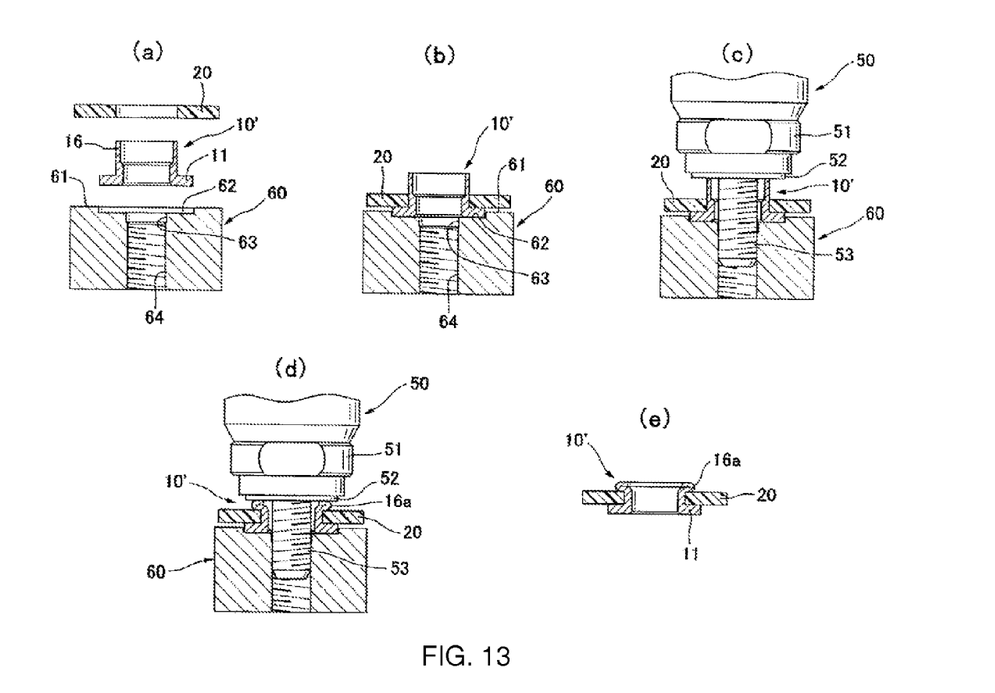
FIGS. 13(a) through 13(e) are cross-sectional views showing the various stages of a first method of the present invention for mounting the metal collar of FIG. 6 on a resin component.

FIG. 13 (a) is a cross-sectional view showing the metal collar 10' and the resin component 20 before they are set in the upper surface 61 of the jig 60. FIG. 13 (b) is a cross-sectional view showing the metal collar 10' and the resin component 20 after the sleeve 12 of the metal collar 10' has been inserted from below into the mounting hole 21 of the resin component 20, and the metal collar 10' has been set in the tray 62 portion in the upper surface 61 of the jig 60.

In FIG. 13 (c), the screw mandrel 53 has been passed through the through-hole 13 in the metal collar 10', then rotated in the forward direction, and the male threading in the screw mandrel 53 has engaged the female threading in the female threaded hole 64 of the jig 60. At this time, the metal collar 10' is pushed into the tray portion 62 of the jig 60 without being rotated. When the male threading of the screw mandrel 53 has engaged the female threaded hole 64 to a predetermined length, the lower surface of the nosepiece 52 of the fastening tool 50 abuts the end surface of the leading end 14 of the metal collar 10', and rotation of the screw mandrel 53 is stopped.

In FIG. 13 (d), the screw mandrel 53 is withdrawn towards the main unit 51 without rotating, while the lower surface of the nosepiece 52 of the fastening tool 50 abuts the end surface of the end portion 14 of the metal collar 10'. This withdrawal is done with sufficient force so that, as the lower surface of the nosepiece 52 pushes the end surface of the leading end 14 of the metal collar 10' downward, the thin portion 16 above the tiered portion 15 is buckled, and the outer diameter of the thin portion 16 is enlarged. The resin component 20 is thereby retained between the buckled portion 16a and the flange 11. As a result, the metal collar 10' cannot come out of the mounting hole 21 in the resin component 20. At this time, because the length of the stroke drawing in the screw mandrel 53 is controlled, the screw mandrel is drawn in up to a predetermined length, and the process is stopped. Alternatively, the load can be controlled when the screw mandrel 53 is drawn in, and the process can be stopped when a predetermined load has been reached.

After the fastening process performed by the fastening tool 50 has been ended, the screw mandrel 53 is rotated in the reverse direction with respect to FIG. 13 (c), and the female threading in the female threaded hole 64 of the jig 60 is disengaged from the male threading of the screw mandrel 53. After the respective threadings have been disengaged, the fastening tool 50 is raised off the jig 60. FIG. 13 (e) is a cross-sectional view showing the resin component 20 in which the metal collar 10' of the second embodiment of the present invention has been attached after removal from the fastening tool 50 and the jig 60.

In FIGS. 13(a) through 13(e), the sleeve 12 of the metal collar 10' is inserted into the mounting hole 21 in the resin component 20 from below, the flange 11 is received by the jig 60, the leading end 14 is pressed by the nosepiece 52 of the fastening tool 50, and an enlarged portion 14a, 14b is formed. However, if desired, the vertical orientation of the metal collar 10' can be reversed. In other words, according to a second method of the present invention, the sleeve 12 of the metal collar 10' can be inserted into the mounting hole 21 in the resin component 20 from above, the leading end 14 can be received by the jig 60, the flange 11 can be pressed by the nosepiece 52 of the fastening tool 50, and the enlarged portion 14a, 14b can be formed by the tray portion 62 in the jig 60. The operations performed to mount a metal collar 10' in a resin component 20 using the second method of the present invention are explained with reference to FIGS. 14(a) through 14(e).

Figure 14:
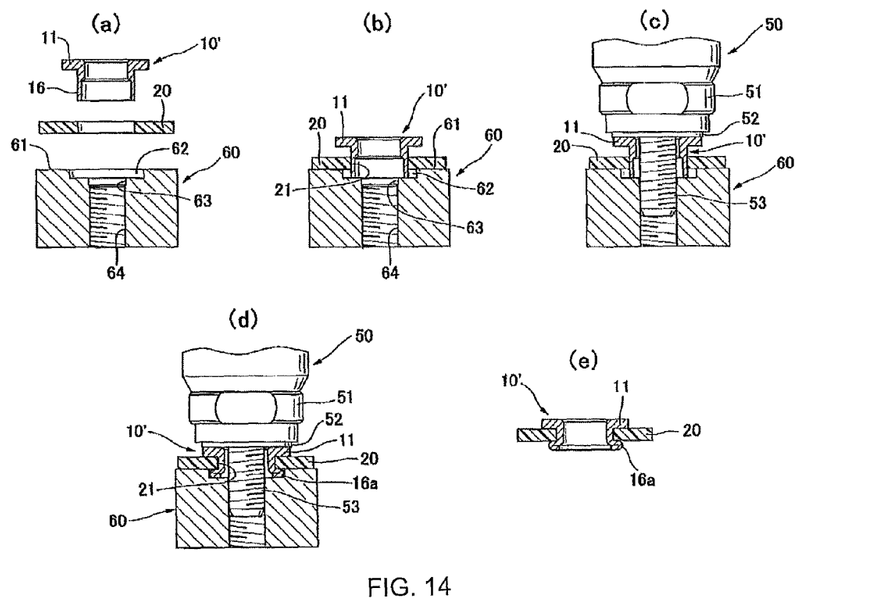
FIGS. 14(a) through 14(e) are cross-sectional views showing the various stages of a second method of the present invention for mounting the metal collar of FIG. 6 on a resin component.

FIG. 14 (a) is a cross-sectional view showing a resin component 20 and a metal collar 10' set on the upper surface 61 of the jig 60. In this orientation of metal collar 10', the flange 11 is on the upper end. FIG. 14 (b) is a cross-sectional view showing the sleeve 12 of the metal collar 10' inserted into the mounting hole 21 in the resin component 20 from above, and the metal collar 10' set inside the tray portion 62 in the upper surface 61 of the jig 60.

In FIG. 14 (c), the screw mandrel 53 is inserted into the through-hole 13 in the metal collar 10', the screw mandrel 53 is rotated in the forward direction, and the male threading of the screw mandrel 53 engages the female threading in the female threaded hole 64 in the jig. At this time, the end surface of the leading end 14 of the metal collar 10' is pushed into the tray portion 62 of the jig 60 without being rotated. When the male threading of the screw mandrel 53 has engaged the female threaded hole 64 to a predetermined length, the lower surface of the nosepiece 52 of the fastening tool 50 abuts the flange 11 of the metal collar 10', and rotation of the screw mandrel 53 is stopped.

In FIG. 14 (d), the screw mandrel 53 is withdrawn towards the main unit 51 without rotating, while the lower surface of the nosepiece 52 of the fastening tool 50 abuts the flange 11 of the metal collar 10'. The withdrawal is done with sufficient force so that, as the lower surface of the nosepiece 52 pushes the flange 11 of the metal collar 10' downward, the tray portion 62 in the upper surface 61 of the jig 60 pushes the end surface of the thin portion 16 of the metal collar 10' upward, the thin portion 16 below the tiered portion 15 is buckled, and the outer diameter of the thin portion 16 is enlarged. The tray portion 62 regulates the outer diameter of the buckled portion 16a. The resin component 20 is thereby retained between the buckled portion 16a and the flange 11. As a result, the metal collar 10' does not come out of the mounting hole 21 in the resin component 20.

After the fastening process performed by the fastening tool 50 has been ended, the screw mandrel 53 is rotated in the reverse direction with respect to FIG. 14 (c), and the female threading in the female threaded hole 64 of the jig 60 is disengaged from the male threading of the screw mandrel 53. After the respective threadings have been disengaged, the fastening tool 50 is raised off the jig 60. FIG. 14. (e) is a cross-sectional view showing the resin component 20 in which the metal collar 10' has been attached after removal from the fastening tool 50 and the jig 60.

In the method used to form the second embodiment of the collar and resin component assembly shown in FIGS. 10 through 13, female threading is formed in the jig 60, and male threading is formed in the screw mandrel 53 of the fastening tool 50. However, the metal collar can be mounted in a resin component using a jig having male threading, and a fastening tool able to grip the male threading of the jig can be used to engage and draw in the male threading.

Thus, it can be seen that, using the methods of the present invention with respect to the first and second embodiments of the metal collar of the present invention, a metal collar can be quickly and easily mounted in a resin component without using a press machine. Also, a metal collar can be easily mounted in a resin component having an intricate shape or large shape. Also, a metal collar can be mounted in a resin component at a location not limited to one at which a press machine can be found.

Figure 15:
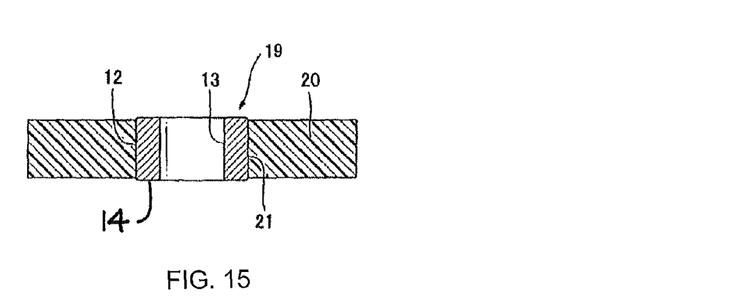
FIG. 15 is a cross-sectional view of a third embodiment of a metal collar of the present invention in which a metal collar is mounted in a resin component without any deformation of the metal collar.

A metal collar of the first and second embodiments of the present invention is deformed and mounted in a resin component. However, using a third mounting method of the present invention, a metal collar with a sleeve of a third embodiment of the present invention can be strongly pushed in and mounted in a resin component without deforming the sleeve. FIG. 15 is a cross-sectional view of the third embodiment of the present invention, in which a metal collar 19 with a sleeve 12 is pushed in and mounted in a mounting hole 21 in a resin component 20. The outer diameter of the metal collar 19 is larger than the inner diameter of the mounting hole 21 in the resin component 20 so that the metal collar 19 can be pushed in and securely mounted as, for example, with a press-fit, in the mounting hole 21 in the resin component 20. The metal collar 19 shown in FIG. 15 does not have a flange, but a metal collar with a flange can also be used in this method.

With reference to FIGS. 14(a) and 14 (b), the metal collar 19 of the third embodiment of the present invention is placed in the tray portion 62 of the jig 60, and the resin component 20 is arranged on top of the metal collar 19 so that the mounting hole 21 in the resin component 20 is aligned with the outer periphery of the metal collar 19. In a fashion similar to that shown in FIG. 14(c), the screw mandrel 53 of the fastening tool 50 is passed through the mounting hole 21 of the resin component 20 and the through-hole 13 in the metal collar 19, and the male threading of the screw mandrel 53 is engaged with the female threading in the female threaded hole 64 of the jig 60. When the lower surface of the nosepiece 52 of the fastening tool 50 abuts the upper surface of the resin component 20, rotation of the screw mandrel 53 is stopped, and the screw mandrel 53 is withdrawn towards the main unit 51. In a fashion similar to that shown in FIG. 14(d), the screw mandrel 53 is withdrawn with sufficient force so that the upper surface 61 of the jig 60 pushes upward on the end surface of the leading end 14 of the metal collar 19, and the metal collar 19 is pushed into the mounting hole 21 in the resin component 20. The screw mandrel 53 is then rotated in the reverse direction, and the female threading of the jig 60 is disengaged from the male threading of the screw mandrel 53. This results in the state shown in FIG. 15. In this third embodiment of the metal collar 19 of the present invention, if desired, as set forth above, the outer surface of the metal collar 19 and the inner surface of the through-hole 13 can have circular or oval cross-sections, and the inner surface of the mounting hole 21 in the resin component 20 can have circular or oval-shaped cross-sections, respectively. In the third embodiment of the metal collar of the present invention, the outer diameter of the metal collar 19 is somewhat larger than the inner diameter of the mounting hole 21 in the resin component 20. However, using the third method of the present invention, the metal collar 19 is easily pushed into the resin component 20, even when strong pushing strength is required, but does not come out of the resin component easily.

It will be appreciated by persons skilled in the art that the above embodiments have been described by way of example only, and not in any limitative sense, and that various alterations and modifications are possible without departure from the scope of the invention as defined by the appended claims.

What is claimed is:

1. A method for mounting a metal collar in a mounting hole of a resin component using a fastening tool, a screw mandrel with male threading, and a jig having an upper surface and further having female threading for engaging the male threading of the screw mandrel, wherein the metal collar having a sleeve defining a through-hole and further having a flange formed on one end of the sleeve, the sleeve having an end surface of a leading end opposite that of the flange, and wherein the fastening tool having a nosepiece defining a lower surface for engaging the resin component, comprising the steps of:
- (a) inserting the sleeve of the metal collar from below into the mounting hole of the resin component, and setting the metal collar so that the flange of the metal collar abuts the upper surface of the jig;
- (b) inserting the screw mandrel of the fastening tool into the through-hole of the metal collar, and rotating the screw mandrel in the forward direction so that the male threading of the screw mandrel engages the female threading of the jig;
- (c) abutting the lower surface of the nosepiece of the fastening tool against the end surface of the leading end of the metal collar, and stopping the rotation of the screw mandrel;
- (d) withdrawing the screw mandrel, while the lower surface of the nosepiece is abutting the end surface of the leading end of the metal collar, with sufficient force so that the lower surface of the nosepiece pushes downward on the end surface of the leading end of the metal collar to form an enlarged portion in the leading end of the metal collar, thereby securing the resin component between the enlarged portion and the flange; and
- (e) rotating the screw mandrel in the reverse direction to disengage the female threading of the jig from the male threading of the screw mandrel.

2. The method claimed in claim 1, wherein, in the step of withdrawing the screw mandrel, a portion adjacent the end surface of the leading end of the metal collar is buckled to form the enlarged portion.

3. The method claimed in claim 1, wherein, in the step of withdrawing the screw mandrel, the diameter of the end surface of the leading end of the metal collar is flared out to form the enlarged portion.

4. The method claimed in claim 1, wherein a tiered portion is formed in the through-hole of the metal collar, the side of the tiered portion opposite that of the flange is a thin portion, and, in the step of withdrawing the screw mandrel, the thin portion is enlarged to form the enlarged portion.

5. The method claimed in claim 1, wherein the resin component has a recess for accommodating the flange of the metal collar, and a counter bore for accommodating the enlarged portion of the metal collar.

6. The method claimed in claim 1, wherein the cross-sections of the outer surface of the sleeve and the inner surface of the through-hole in the metal collar are circular, and the cross-section of the inner surface of the mounting hole in the resin component is circular.

7. The method claimed in claim 1, wherein the cross-sections of the outer surface of the sleeve and the inner surface of the through-hole in the metal collar are oval-shaped, and the cross-section of the inner surface of the mounting hole in the resin component is oval-shaped.

8. The method claimed in claim 1, wherein the step of withdrawing the screw mandrel is accomplished without rotating the screw mandrel.

\* \* \* \* \*